United States Patent
Furlan

(10) Patent No.: US 9,633,415 B2
(45) Date of Patent: *Apr. 25, 2017

(54) SYSTEMS AND METHODS FOR IMPROVING VIDEO STUTTER IN HIGH RESOLUTION PROGRESSIVE VIDEO

(71) Applicant: LinkedIn Corporation, Mountain View, CA (US)

(72) Inventor: John Furlan, Belmont, CA (US)

(73) Assignee: LinkedIn Corporation, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/943,171

(22) Filed: Nov. 17, 2015

(65) Prior Publication Data

US 2016/0071248 A1 Mar. 10, 2016

Related U.S. Application Data

(63) Continuation of application No. 13/353,176, filed on Jan. 18, 2012, now Pat. No. 9,196,016.

(51) Int. Cl.
*G06T 5/00* (2006.01)
*H04N 19/61* (2014.01)
(Continued)

(52) U.S. Cl.
CPC ......... *G06T 5/002* (2013.01); *H04N 7/26244* (2013.01); *H04N 7/26313* (2013.01);
(Continued)

(58) Field of Classification Search
CPC . H04N 7/50; G06T 5/002; G06T 2207/20201; G06T 2207/10016
See application file for complete search history.

(56) References Cited

U.S. PATENT DOCUMENTS 8,610,818 B2* 12/2013 Furlan ................... H04N 19/51
348/180
9,196,016 B2 11/2015 Furlan
(Continued)

OTHER PUBLICATIONS

"U.S. Appl. No. 13/353,176, Non Final Office Action mailed Mar. 19, 2015", 10 pgs.
(Continued)

*Primary Examiner* — Shawn An
(74) *Attorney, Agent, or Firm* — Schwegman Lundberg & Woessner, P.A.

(57) ABSTRACT

Systems and methods for improving video stutter in high resolution progressive video captured with fast exposure times. In a first approach, digital video is captured with fast shutter speeds that cause objects moving within the frame to appear motionless. The video codec generates motion information that may be utilized to add an artificial motion blur to each frame of the digital video during processing in a digital video pipeline. The motion blur creates the appearance that an object is moving in the frame. In a second approach, the lens assembly of the digital camera includes an electronically controlled filter that attenuates the light reaching an image sensor such that the shutter speeds may be decreased in order to capture motion blur. The electronically controlled filter may be a liquid crystal display (LCD) device that is set to a plurality of different transparency levels based on a target exposure value.

18 Claims, 13 Drawing Sheets

(51) Int. Cl.
    *H04N 19/176* (2014.01)
    *H04N 19/189* (2014.01)
    *H04N 19/46* (2014.01)
    *H04N 19/172* (2014.01)
    *H04N 19/109* (2014.01)
    *H04N 19/162* (2014.01)
    *H04N 19/00* (2014.01)
    *H04N 19/44* (2014.01)

(52) U.S. Cl.
    CPC ............. *H04N 7/50* (2013.01); *H04N 19/109* (2014.11); *H04N 19/162* (2014.11); *H04N 19/172* (2014.11); *H04N 19/176* (2014.11); *H04N 19/46* (2014.11); *H04N 19/61* (2014.11); *G06T 2207/10016* (2013.01); *G06T 2207/20201* (2013.01); *H04N 7/26335* (2013.01); *H04N 19/44* (2014.11)

(56) References Cited

U.S. PATENT DOCUMENTS

| | | | |
|---|---|---|---|
| 2002/0012052 A1* | 1/2002 | Nagano | H04N 5/2254 348/228.1 |
| 2004/0218246 A1* | 11/2004 | Onuki | G02B 5/205 359/234 |
| 2005/0253853 A1 | 11/2005 | Sayre et al. | |
| 2010/0214422 A1 | 8/2010 | Iwamura et al. | |
| 2012/0002000 A1* | 1/2012 | Guerrero | H04N 19/172 348/14.02 |
| 2013/0182756 A1 | 7/2013 | Furlan | |

OTHER PUBLICATIONS

"U.S. Appl. No. 13/353,176, Notice of Allowance mailed Jul. 22, 2015", 8 pgs.

"U.S. Appl. No. 13/353,176, Response filed Jun. 19, 2015 to Non-Final Office Action mailed Mar. 19, 2015", 9 pgs.

\* cited by examiner

SYSTEMS AND METHODS FOR IMPROVING VIDEO STUTTER IN HIGH RESOLUTION PROGRESSIVE VIDEO

RELATED APPLICATIONS

This application is a continuation of and claims the benefit of priority from U.S. patent application Ser. No. 13/353,176, filed Jan. 18, 2012, issued on Nov. 24, 2015, as U.S. Pat. No. 9,196,016, which is hereby incorporated by reference in its entirety.

BACKGROUND

Technical Field

The present disclosure relates generally to digital video processing and, more specifically, to improving video stutter in high resolution progressive video.

Description of the Related Art

Conventionally, optical video cameras are configured to capture video on film using a shutter speed that corresponds to the frame rate of the captured video. For example, a camera could be configured to capture film at twenty four frames per second. The shutter speed associated with that frame rate may be approximately $1/48^{th}$ of a second. Thus, each frame of film is exposed for approximately half of the time period associated with that frame. The shutter speed may be increased to expose each frame of film for a longer period of time, or the shutter speed may be decreased to expose each frame of film for a shorter period of time. Slower shutter speeds enable objects in motion to appear blurred and stretched along the path that the object travels from the start of the exposure to the end of the exposure. By contrast, faster shutter speeds result in objects in motion appearing crisp and motionless in each frame. A stuttering effect may be noticeable to a viewer of the film where the object in motion appears to jump from one position to a new position between successive frames, always appearing motionless in each frame.

When filming in bright light, long exposure times may lead to an image that is too bright, overexposing portions of the frame and resulting in lost detail. To correct for bright conditions, a cinematographer may reduce the aperture size of the lens (by changing the lens or by adjusting a mechanical iris) or install a neutral density filter in front of the lens in order to reduce the amount of light that reaches the film during exposure. Alternately, the cinematographer could adjust the shutter speed to shorten the exposure time, but faster shutter speeds may reduce motion blur causing the stuttering effect to be more pronounced.

Recently, digital video cameras have been introduced that are replacing many of the more complex mechanical, optical systems. The digital video camera may include a photosensitive image sensor, such as a charge-coupled device (CCD) or a complementary metal oxide semiconductor (CMOS) image sensor. Many digital video cameras, especially those cameras targeted to the consumer market, do not implement variable aperture size within the lens assembly. By contrast, the digital video camera typically adjusts for overexposure by increasing the shutter speed, which may be controlled electronically. This type of operation results in less motion blur and may cause a noticeable increase in the stuttering effect, discussed above.

BRIEF DESCRIPTION OF THE DRAWINGS

So that the manner in which the features of the present disclosure can be understood in detail, a more particular description may be had by reference to example embodiments, some of which are illustrated in the appended drawings. It is to be noted, however, that the appended drawings illustrate only example embodiments and are therefore not to be considered limiting of its scope, for the disclosure may admit to other equally effective embodiments.

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

In the following description, numerous specific details are set forth to provide a more thorough understanding of various example embodiments. However, it will be apparent to one of skill in the art that certain embodiments may be practiced without one or more of these specific details. In other instances, well-known features have not been described in order to avoid obscuring the disclosure.

Overview

One example embodiment sets forth a method comprising detecting that one or more frames of a digital video sequence are associated with a shutter speed that is substantially greater than a frame rate of the digital video sequence, determining motion information associated with a plurality of pixels in a first frame of the digital video sequence, and, in response to detecting that one or more frames of a digital video sequence are associated with a shutter speed that is substantially greater than a frame rate of the digital video sequence, adding a motion blur effect to at least a portion the first frame based on the motion information.

Another example embodiment sets forth a computer-readable medium including instructions that, when executed by a processing unit, cause the processing unit to perform the steps of detecting that one or more frames of a digital video sequence are associated with a shutter speed that is substantially greater than a frame rate of the digital video sequence, determining motion information associated with a plurality of pixels in a first frame of the digital video sequence, and, in response to detecting that one or more frames of a digital video sequence are associated with a shutter speed that is substantially greater than a frame rate of the digital video sequence, adding a motion blur effect to at least a portion the first frame based on the motion information.

Yet another example embodiment sets forth a system comprising a processing unit configured to detect that one or more frames of a digital video sequence are associated with a shutter speed that is substantially greater than a frame rate of the digital video sequence, determine motion information associated with a plurality of pixels in a first frame of the digital video sequence, and, in response to detecting that one or more frames of a digital video sequence are associated with a shutter speed that is substantially greater than a frame rate of the digital video sequence, add a motion blur effect to at least a portion the first frame based on the motion information.

DETAILED DESCRIPTION OF THE FIGURES

Figure 1:
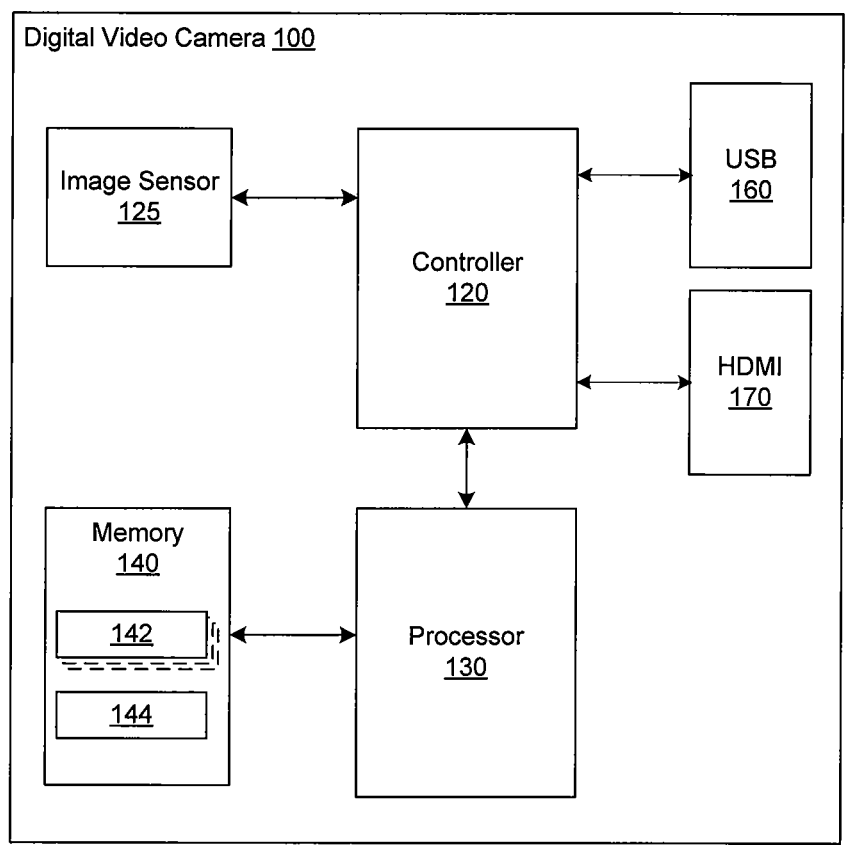
FIG. 1 illustrates a digital video camera 100, according to one example embodiment.

FIG. 1 illustrates a digital video camera 100, according to one example embodiment. As shown, digital video camera 100 includes a processor 130 and a memory 140 as well as a controller 120 configured to interface with one or more electronic components of the digital video camera 100. Processor 130 is configured to perform one or more operations that control the function of the digital video camera 100. In one embodiment, processor 130 may include one or more processing engines configured to manipulate the raw image sensor data received from image sensor 125 to generate one or more digital videos 142 stored in memory 140. Each frame of a digital video 142 corresponds to a plurality of intensity values captured by image sensor 125. Memory 140 also includes firmware 144 that, when executed by processor 130, is configured to process the raw image sensor data to generate digital videos 142.

In one embodiment, memory 140 may be a non-volatile memory such as a flash memory device (removable or non-removable) or a solid state drive. In another embodiment, memory 140 may be a volatile memory (DRAM, on-chip static RAM, etc.) for temporary storage of the digital videos 142. In such embodiments, digital video camera 100 may include a communications interface such as USB 60, or some other technically feasible communication interface, to transmit the digital videos 142 to a peripheral device for non-volatile storage. In yet other embodiments, memory 140 may include both a non-removable flash memory storage device that includes firmware 144 and a removable flash memory storage device for storing digital videos 142.

Controller 120 may be coupled to processor 130, image sensor 125, USB interface 160, and HDMI interface 170 as well as various other electronic components (not shown) of digital video camera 100. Image sensor 125 is a photosensitive image sensor such as a CMOS image sensor or a CCD image sensor. Image sensor 125 may be included in a lens assembly that includes a lens, an aperture, a shutter, and the image sensor 125. Controller 120 may include one or more Analog-to-Digital Converters (ADC) that are configured to sample intensity values from the image sensor 125. For example, processor 130 may send a command to controller 120 that causes controller 120 to sample each of the pixel locations in image sensor 125 to generate raw image sensor data corresponding to a single frame of digital video 142. In one embodiment, controller 120 may be configured to transmit raw image sensor data to processor 130 that corresponds to the sampled intensity values for each pixel location of image sensor 125 (i.e., each pixel location of the raw image sensor data corresponds to an intensity value for one of a plurality of color channels). In another embodiment, controller 120 may be configured to calculate a filtered intensity value for each pixel location of image sensor 125 based on the intensity values for a plurality of pixel locations proximate to the particular pixel location of image sensor 125. For example, controller 120 may be configured to average a plurality of intensity values in a 3×3 block of pixel locations. In still other embodiments, controller 120 may be configured to generate raw image sensor data in a format in which each pixel of the raw image sensor data includes intensity values for a plurality of color channels, such as an RGB format, sampled from a plurality of different pixel locations. In yet other embodiments, image sensor 125 may include one or more ADCs for sampling the pixel locations to generate the raw image sensor data, and then image sensor 125 may be configured to transmit the raw image sensor data over a digital communications interface to controller 120.

Figure 2:
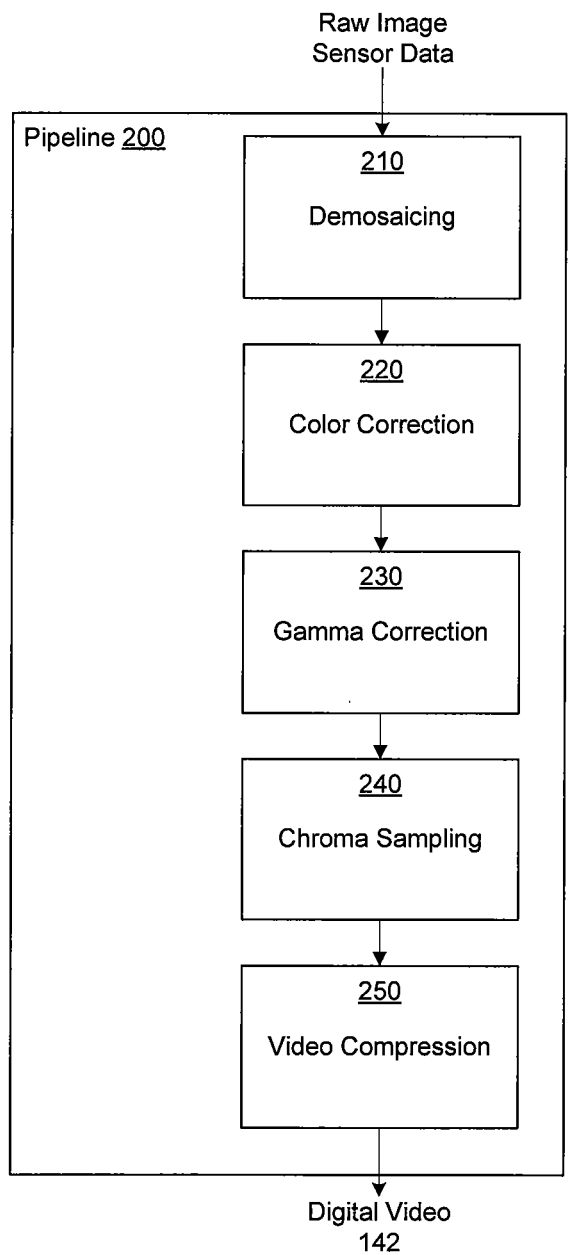
FIG. 2 illustrates a digital image processing pipeline 200 implemented by digital video camera 100 of FIG. 1, according to one example embodiment.

FIG. 2 illustrates a digital image processing pipeline 200 implemented by digital video camera 100 of FIG. 1, according to one example embodiment. A typical example of a digital image processing pipeline 200 includes a demosaic processing block 210, a color correction block 220, a gamma correction block 230, a chroma subsampling block 240, and a compression block 250. It will be appreciated that various digital video camera manufacturers may implement different processing blocks in digital image processing pipeline 200. For example, some digital image processing pipelines may include a white balance block (not shown), which adjusts the intensities of each color channel such that the mean intensity values associated with each color channel over all pixel locations are equal. Other digital image processing pipelines may not include one or more of the image processing blocks shown in FIG. 2.

As shown, demosaic processing block 210 generates a digital image in an RGB format by processing the raw image sensor data from image sensor 125. Many algorithms for interpolating the raw image sensor data exist in the art, such as nearest neighbor interpolation, bilinear interpolation, or variable gradient interpolation. In a demosaic processing block 210 that implements nearest neighbor interpolation, the intensity value sampled from each pixel location of raw image sensor data is combined with intensity values from two neighboring pixel locations to generate a pixel in a digital image that includes intensity values for all three color channels. In a demosaic processing block 210 that implements bilinear interpolation, the intensity value stored in each pixel location of raw image sensor data is combined with interpolated intensity values from two or more neighboring pixel locations to generate a single pixel in an RGB format.

Color correction block 220 is applied to the digital image in an RGB format generated by the demosaic processing block 210. The spectral response of image sensor 125 may be different than the spectral response of a human observer. The difference between the captured colors and the colors as observed by a human observer may be due to a variety of factors such as manufacturing variance in color filter arrays (CFA) implemented in the image sensor 125 as well as crosstalk between neighboring pixel locations. Therefore, the colors captured by image sensor 125 may be corrected by mapping the captured digital image colorspace to a standard colorspace, such as sRGB.

Conventionally, color correction block 220 is implemented by multiplying each RGB pixel vector by a color correction matrix, as illustrated by Equation (i). The color correction matrix coefficients are chosen to map the captured digital image colorspace to the standard colorspace.

$$\begin{bmatrix} R' \\ G' \\ B' \end{bmatrix} = \begin{bmatrix} C_{RR} & C_{RG} & C_{RB} \\ C_{GR} & C_{GG} & C_{GB} \\ C_{BR} & C_{BG} & C_{BB} \end{bmatrix} \cdot \begin{bmatrix} R \\ G \\ B \end{bmatrix} \quad (i)$$

In addition to the demosaic processing block 210 and the color correction block 220, digital image processing pipeline 200 includes a gamma correction block 230, a chroma subsampling block 240, and a compression block 250. Gamma correction block 230 adjusts the brightness of the RGB values such that the digital image, when displayed on a monitor with a non-linear brightness response, properly reproduces the true colors of the captured scene. Chroma subsampling block 240 divides the three color channels into a single luminance channel and two color difference channels. Because human vision responds more to luminance than chrominance, the two color difference channels can be stored with less bandwidth than the luminance channel without reducing the overall quality of the digital image. Compression block 250 receives a plurality of digital images captured by image sensor 125 and generates the digital video 142 using a compression algorithm. In one embodiment, compression block 250 compresses digital video 142 using an MPEG-2 codec. In another embodiment, compression block 250 compresses digital video 142 using an H.264/MPEG-4 Part 10 codec, also known as AVC (Advanced Video Coding).

The demosaic processing block 210, color correction block 220, gamma correction block 230, and chroma subsampling block 240 are conventional processing blocks well-known in the art. As discussed above, these blocks are shown for illustrative purposes in digital image processing pipeline 200, and different processing blocks in addition to or in lieu of these processing blocks are within the scope of the disclosure.

Figure 3A:
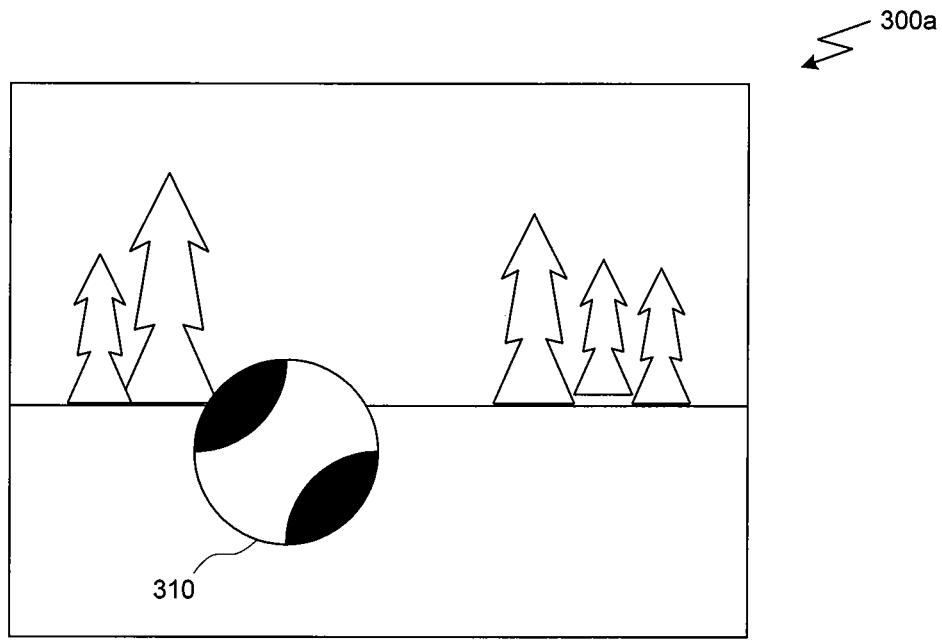
FIGS. 3A-3B are a conceptual illustration of the stuttering effect caused by short exposure times, according to one example embodiment.
Figure 3B:
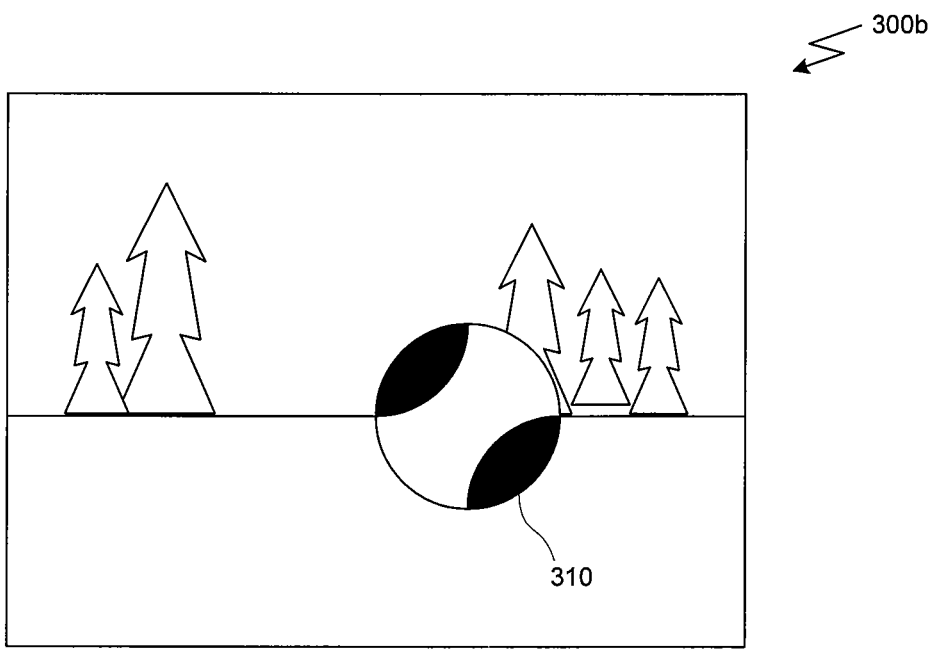

FIGS. 3A-3B are a conceptual illustration of the stuttering effect caused by short exposure times, according to one example embodiment. FIG. 3A represents a first frame 300a in a digital video 142 captured via shutter speeds that are substantially faster than the frame rate of the video, and FIG. 3B represents a second frame 300b in the digital video 142 captured subsequent to frame 300a. For example, digital video 142 may be configured with a frame rate of 30 frames per second of video, which corresponds to a duration of time per frame of approximately 33.3 ms. However, in bright conditions, a photographer or an automatic exposure algorithm may select an exposure time that is only a fraction of the time associated with each frame. For example, exposure times in bright conditions may be 5 ms or less. As shown in FIG. 3A, frame 300a shows a scene that includes a stationary background and an object 310 that is moving from left to right across the frame. Frame 300b shows a similar scene to the scene shown in frame 300a. However, in frame 300b, object 310 is located further along the path of motion at a point closer to the right side of the frame.

As illustrated in frames 300a and 300b, object 310 is crisp and clear and appears to be motionless when looking at each frame individually. However, when viewed within the context of the digital video 142 being played back at 30 frames per second, object 310 appears to jump from a first position in frame 300a to a second position in frame 300b. In high resolution video displayed on a large screen, the stuttering effect is noticeable and disturbing to a viewer because a viewer's brain can detect that the motion is not fluid and uniform. In low light conditions, the stuttering effect may be reduced by increasing exposure times for each frame, thus capturing the object 310 at different positions along the path of motion, commonly referred to as motion blur. However, in bright conditions, longer exposure times may cause the image to be overexposed, thereby whiting out portions of the frame.

Figure 4A:
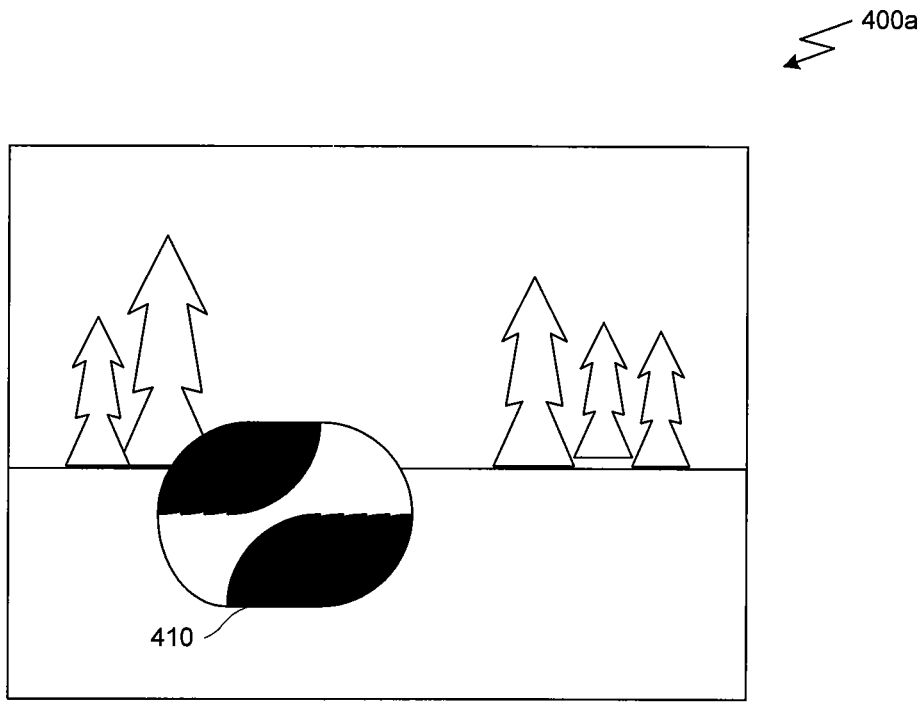
FIGS. 4A-4B are a conceptual illustration of motion blur added to the video frames 300a and 300b of FIGS. 3A-3B, according to one embodiment.
Figure 4B:
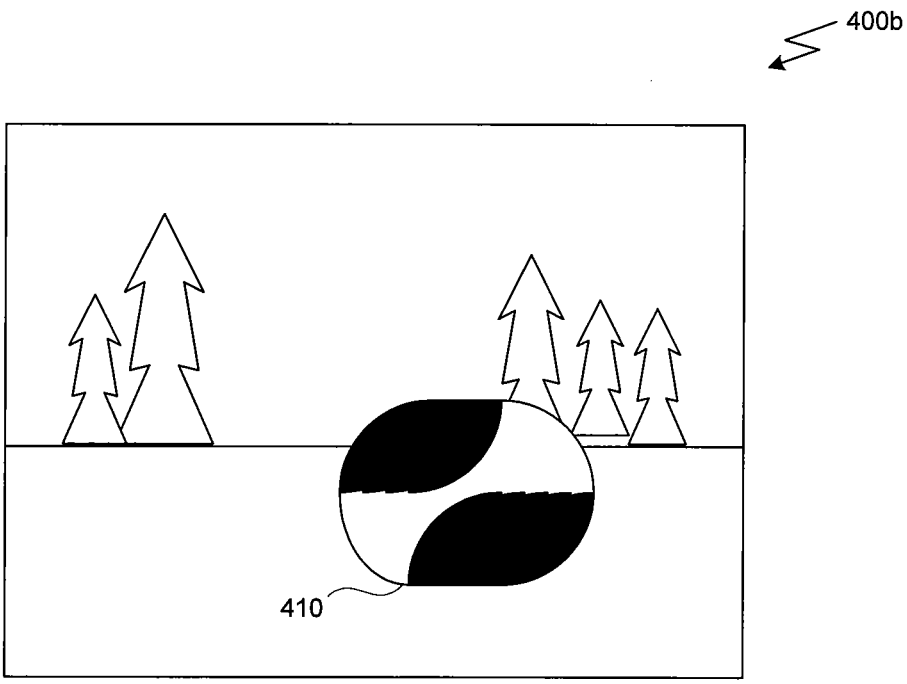

FIGS. 4A-4B are a conceptual illustration of motion blur added to the video frames 300a and 300b of FIGS. 3A-3B, according to one embodiment. As shown in FIGS. 4A and 4B, frames 400a and 400b are similar to frames 300a and 300b, described above, except that object 310 has been replaced by object 410, which is a representation of object 310 with an applied motion blur effect. During long exposures, object 310 travels from a first position in the frame to a second position in the frame during the duration of the exposure and, consequently, object 310 appears blurry and elongated in the relative direction of travel.

Object 310 may also appear partially transparent because stationary objects occluded by object 310 during the beginning of the exposure may be visible at the end of the exposure after object 310 moves toward the right side of the frame. Similarly, stationary objects that are visible during the beginning of the exposure may be occluded as object 310 moves in front of the stationary objects during the end of the exposure. Although not explicitly shown in FIGS. 4A and 4B, the amount of transparency of object 410 may not be linear across the object in the relative direction of motion. For example, the left edge of object 410 at the beginning of the exposure may only occlude stationary background objects for a relatively short period during the beginning of the exposure, and the right edge of object 410 at the end of the exposure may only occlude stationary background objects for a relatively short time during the end of the exposure. In contrast, a stationary background object occluded by the right edge of object 410 during the beginning of the exposure may be fully occluded during the duration of the exposure because the left edge of object 410 did not move far enough towards the right side of the frame to make those stationary background objects visible at the end of the exposure.

As discussed above, one way to introduce motion blur into the frames of video is to film with long exposure times for each frame. Bright light conditions may make it impossible to film with long exposure without overexposing the image sensor 125. One solution to this problem is to reduce the size of the aperture of the lens assembly, which allows less light to reach the image sensor. However, many low cost digital video cameras such as digital video camera 100 have a fixed aperture that is not adjustable. Some high end optical cameras include a mechanical iris that may be actuated to reduce the aperture size and allow filming in bright conditions with long exposure times. However, the mechanical iris may be too costly or bulky to implement in many systems such as the digital cameras included in many of today's cellular phones or handheld video cameras. The mechanical iris may be too large to fit within the thin form factor of these devices. In addition, reducing the size of the aperture also reduces the depth of field (DOF) in the video, which means that two objects at different distances from the camera may not simultaneously both appear sharp and in focus. The instant disclosure describes two alternative solutions for improving video stutter in high resolution progressive video.

Adding Motion Blur During Video Encoding/Decoding

Figure 5:
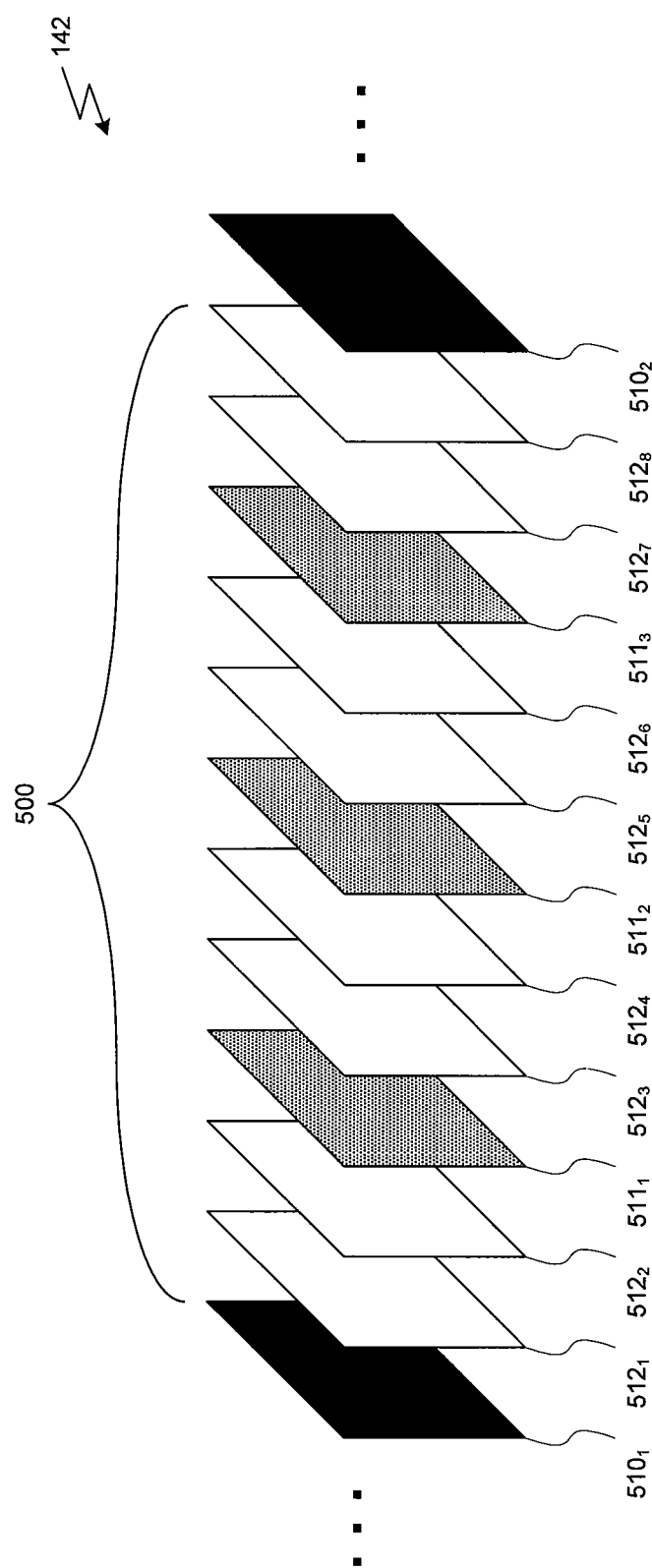
FIG. 5 illustrates a digital video 142 encoded by the compression block 250 of FIG. 2, according to one example embodiment.

A first solution for improving video stuttering implements a motion blur effect in captured video based on motion estimation algorithms already implemented in a digital video processing pipeline. FIG. 5 illustrates a digital video 142 encoded by the compression block 250 of FIG. 2, according to one example embodiment. In one embodiment, compression block 250 may be configured to implement a compression technique that conforms to the H.264/MPEG-4 Part 10 codec. As shown in FIG. 5, digital video 142 includes a plurality of frames of video. The H.264/MPEG-4 Part 10 codec specifies that the digital video 142 be encoded as groups of related frames. Each group of related frames is called a Group of Pictures (GOP) and includes one I-frame as well as a plurality of P-frames and/or B-frames. An I-frame is an intra-coded frame, where all of the data needed to decode the frame is included within the I-frame. A P-frame is a predictive frame that encodes the frame using a reference to the previous I-frame or the previous P-frame. A P-frame associates each macroblock of the uncompressed frame with a motion vector that references a similarly sized block of pixels in the previous I-frame or P-frame. A B-frame is a bi-directional predictive frame that encodes the frame using reference from the preceding I-frame or P-frame as well as the following I-frame or P-frame.

As shown in FIG. 5, digital video 142 includes a GOP 500 that begins with I-frame $510_1$ and ends with B-frame $512_8$. I-frame $510_2$ is associated with the next GOP in digital video 142. In one embodiment, GOP 500 in digital video 142 includes one I-frame $510_1$, three P-frames $511_1$-$511_3$, and eight B-frames $512_1$-$512_8$. In alternative embodiments, GOP 500 may be comprised of a different number of frames, such as 6 frames (one I-frame, one P-frame, and four B-frames).

Figure 6:
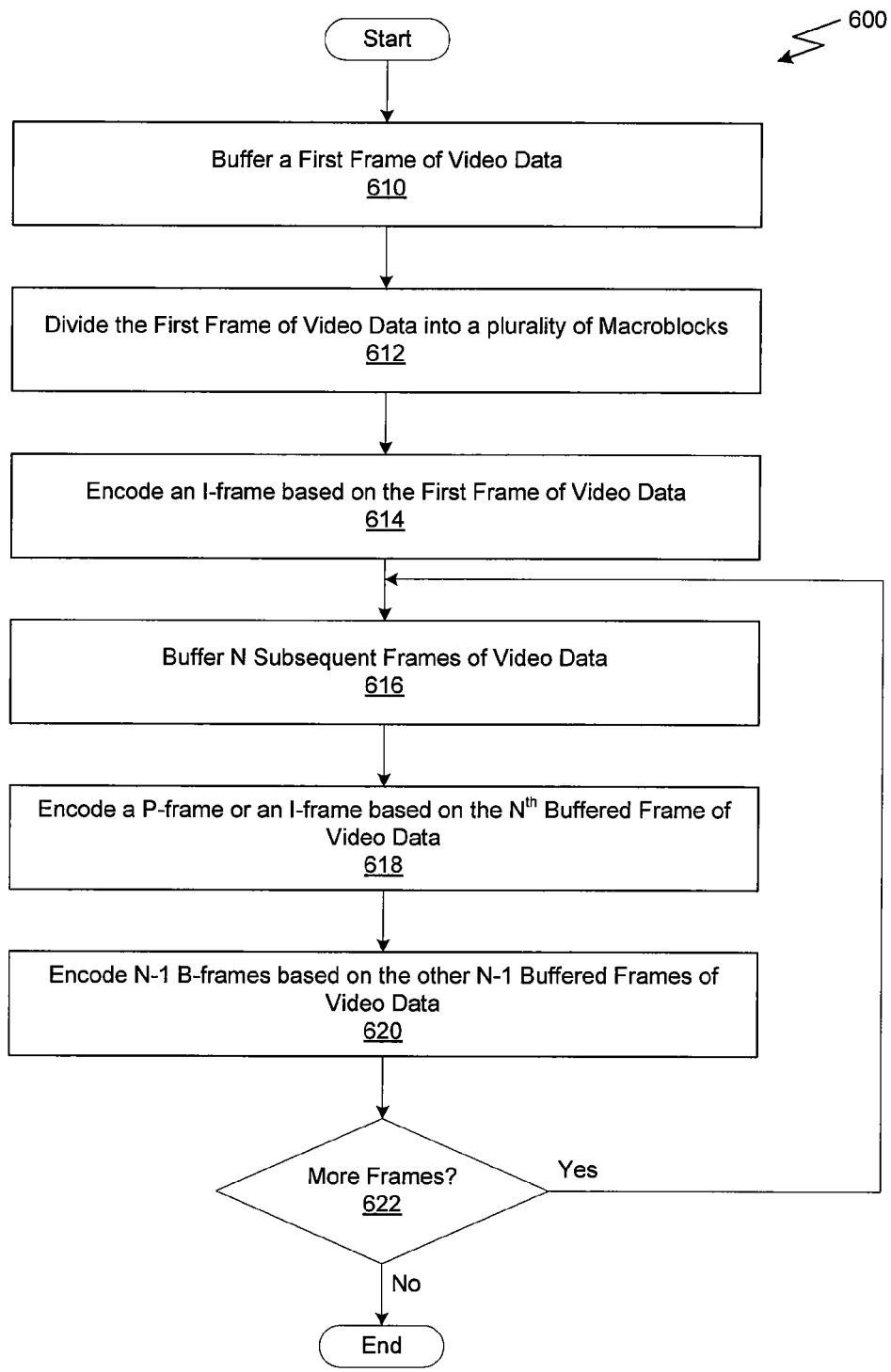
FIG. 6 is a flow diagram of method steps 600 to encode digital video 142 using a motion compensation based encoding technique, according to one example embodiment.

FIG. 6 is a flow diagram of method steps 600 to encode digital video 142 using a motion compensation based encoding technique, according to one example embodiment. Although the method steps 600 are described in conjunction with the systems of FIGS. 1-5, persons skilled in the art will understand that any system configured to perform the method steps is within the scope of the present disclosure.

Method 600 begins at step 610 where compression block 250 buffers a first frame of video data. In one embodiment, compression block 250 receives the frame of video data in a YCrCb format from chroma subsampling block 240. In other words, each pixel in the frame of video data includes a luma intensity value (Y) as well as two color difference intensity values (Cr and Cb). At step 612, compression block 250 divides the frame of video data into a plurality of macroblocks. In one embodiment, each macroblock is 16 pixels in width by 16 pixels in height, and macroblocks may be subdivided into sub-blocks as small as 4 pixels in width by 4 pixels in height.

At step 614, compression block 250 encodes a first I-frame in the digital video 142. In one embodiment, compression block 250 generates four 8 pixel by 8 pixel luminance coefficient blocks as well as one 8 pixel by 8 pixel red difference (Cr) chroma coefficient block and one 8 pixel by 8 pixel blue difference (Cb) chroma coefficient block for each macroblock. The compression block 250 may implement a discrete cosine transform to generate the coefficient blocks from the source video data. The coefficient blocks change the spatial domain of the video data into a frequency domain where, after quantization, many of the high frequency coefficients may be negligible. The compression block 250 then run-length encodes the coefficient blocks to generate an I-frame in the digital video 142.

At step 616, compression block 250 buffers N subsequent frames of video data. For example, if GOP 500 includes two B-frames between each pair of I-frames or P-frames, then N is equal to 3 frames of video data. In addition, compression block 250 keeps the video data in the buffer that is associated with the last prior I-frame or P-frame received by compression block 250. Therefore, compression block 250 has access to the source video data associated with a pair of I-frames or P-frames as well as source video data associated with any B-frames between the pair of I-frames or P-frames.

At step 618, compression block 250 encodes a P-frame or an I-frame based on the $N^{th}$ buffered frame of video data received by compression block 250. If compression block 250 generates an I-frame, then compression block 250 encodes the frame in a similar manner to that described above in conjunction with step 614. However, if compression block 250 generates a P-frame, then compression block 250 compares each macroblock associated with the $N^{th}$ frame of video data to the video data associated with the previous I-frame or P-frame. Compression block 250 may implement a motion estimation algorithm to generate motion vectors associated with each macroblock that describes a location of corresponding pixels in the video data associated with the previous I-frame or P-frame that substantially matches the video data in the macroblock. In one embodiment, a macroblock may be subdivided into smaller sub-blocks (such as 4 pixels by 4 pixels or 16 pixels by 8 pixels), and each sub-block may be compared to the video data associated with the previous I-frame or P-frame to generate motion vectors associated with each sub-block. In one embodiment, motion vectors are specified in an integer number of pixels that describe an offset from the corresponding pixel positions in the previous I-frame or P-frame. In another embodiment, the motion vector may be specified in sub-pixel resolution, such as quarter pixel, that is then used to interpolate the predicted samples based on an interpolation between two or more other pixels in the video data associated with the previous I-frame or P-frame. Compression block 250 then run-length encodes the motion vectors for each macroblock (or sub-blocks) along with a prediction error that specifies the differences between pixels in the frame of video data and pixels at the corresponding locations in the predictive frame of video data as specified by the motion vector.

At step 620, compression block 250 encodes the remaining N-1 frames of buffered video data as B-frames. As described above, B-frames may determine motion vectors associated with a particular macroblock (or sub-block) based on pixel data associated with either the preceding or the following I-frames or P-frames. In one embodiment, compression block 250 may store up to 32 adjacent I-frames or P-frames from which a B-frame may reference in order to determine motion vectors for the various macroblocks or sub-blocks. Once compression block 250 determines motion vectors and prediction error for each of the macroblocks of a B-frame, compression block 250 run-length encodes the data into digital video 142. It will be appreciated that the order of frames in video data 142 may not match the display order of the frames when video data 142 is decoded. For example, compression block 250 may encode I-frame $510_1$ followed by P-frame $511_1$, B-frame $512_1$ and B-frame $512_2$, in that order, even though the display order is I-frame $510_1$, B-frame $512_1$, B-frame $512_2$, and P-frame $511_1$.

At step 622, compression block 250 determines whether there are more frames to include within digital video 142. If there are more frames, then method 600 returns to step 616 where compression block 250 buffers the next N frames of video data. However, if there are no more frames, then method 600 terminates.

Figure 7A:
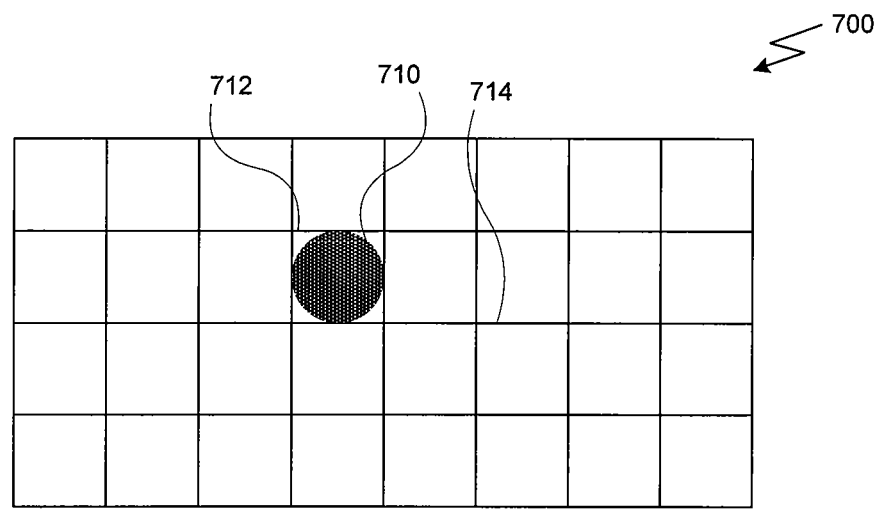
FIGS. 7A-7C illustrate a video processing technique for adding motion blur to a frame of video, according to one example embodiment.
Figure 7B:
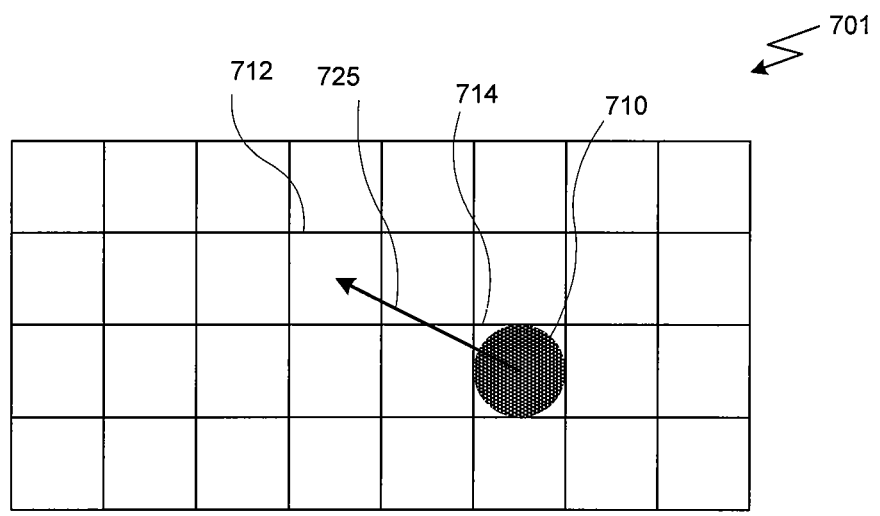
Figure 7C:
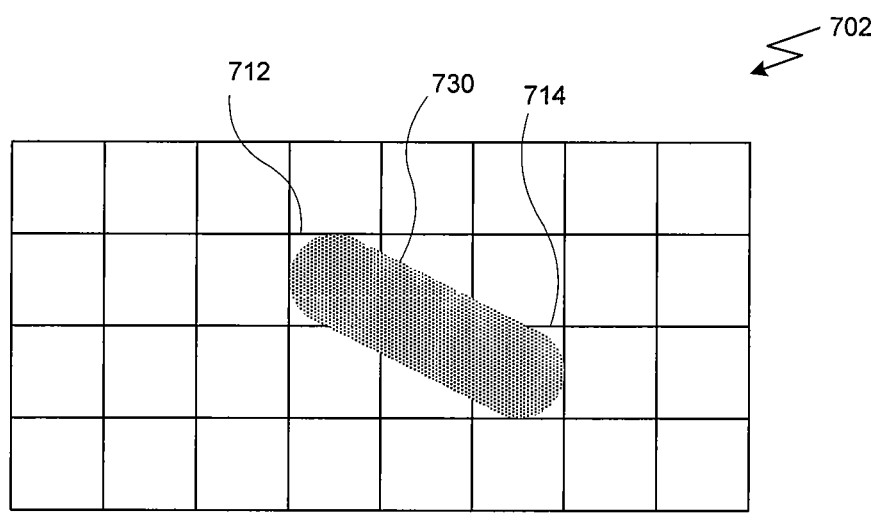

FIGS. 7A-7C illustrate a video processing technique for adding motion blur to a frame of video, according to one example embodiment. As shown in FIG. 7A, frame 700 is divided into a plurality of macroblocks. An object 710 is captured within macroblock 712. In one embodiment, frame 700 is captured with a digital video camera 100 using a shutter speed that is substantially faster than the frame rate of the video. In frame 700, object 710 appears crisp and in focus, although viewed with the context of a single frame, object 710 also appears motionless.

FIG. 7B represents a frame 701 of video captured subsequent to frame 700. During the period of time between the successive exposures of frame 700 and frame 701, object 710 has moved such that the pixels that represent object 710 in frame 701 are now located in macroblock 714. Compression block 250 may implement a motion estimation algorithm, comparing the pixel data in frame 701 to the pixel data in frame 700 in order to generate one or more motion vectors associated with the different macroblocks in frame 701.

In one embodiment, compression block 250 may implement a block-matching algorithm where compression block 250 compares the pixel values in macroblock 714 of frame 701 to a plurality of blocks of pixels proximate to macroblock 714 in frame 700. Compression block 250 compares the intensity values associated with the pixels included in macroblock 714 in frame 701 to blocks of pixels in frame 700 that are offset from macroblock 714 by up to 64 pixels in both directions. If the difference between macroblock 714 in frame 701 and any of the blocks of pixels in frame 700 is below a threshold value, then compression block 250 may generate a motion vector 725 that specifies the distance between macroblock 714 in frame 701 and a corresponding block of pixels in frame 700. As shown in FIG. 7B, motion vector 725 is <−32 px, +16 px>, where a first component of motion vector 725 represents an offset in the horizontal direction and a second component of motion vector 725 represents an offset in the vertical direction. In alternate embodiments, compression block 250 may implement any other technically feasible motion estimation algorithm such as via phase correlation and frequency domain methods, recursive pixel algorithms, or Markov Random Field (MRF) algorithms.

FIG. 7C illustrates a processed frame 702 of video that is generated by compression block 250 based on motion vectors associated with frame 700 and frame 701. After determining a field of motion vectors (i.e., the motion vectors associated with each macroblock of video frame 701), compression block 250 is configured to analyze the motion vector field and apply a motion blur effect to any macroblocks associated with a non-zero motion vector (i.e., macroblocks that are not intra-coded because the prediction error for each of the proximate blocks of pixels in the prediction frame was too great to reliably encode the macroblock via a motion-compensation technique). The motion vector 725 associated with macroblock 714 is <−32 px, 16 px>, and object 730 is a motion-blurred representation of object 710 of frames 700 and 701 applied along the direction of the motion vector 725. In one embodiment, although not explicitly shown in FIG. 7C, object 730 may be partially transparent to better imitate the motion blur of an object captured via a long exposure. In other embodiments, more complex algorithms may be implemented by compression block 250 that better imitate non-uniform motion, such as an object that is accelerating within the frame or an object that is changing direction. For example, compression block 250 may compare a sequence of frames in order to determine a closer approximation of the actual path of the object (e.g., a series of motion vectors may indicate that the object is moving in a circle and the motion blur may be applied on a curved trajectory where the motion vector indicates the tangent of the path at one point in the exposure).

Compression block 250 may be configured to apply the motion blur to only a select number of macroblocks within the frame of video. In one embodiment, compression block 250 compares the magnitude of the motion vector associated with each macroblock to a threshold value. If the magnitude of the motion vector is above the threshold value, then compression block 250 applies the motion blur effect to at least a portion of the frame in the direction of the motion vector. In another embodiment, compression block 250 may analyze the motion vector field as well as the source video data to find edges associated with an object in the frame (e.g., with an edge-detection algorithm). For each object discovered in the frame of video, compression block 250 may analyze the motion vectors across one or more frames of video to determine a motion path for the object and apply a motion blur effect to any pixels within the defined edges of the object based on the calculated motion path.

It will be appreciated that the motion vectors generated by compression block 250 may not be related to the immediately adjacent frame. For example, a motion vector associated with a macroblock in P-frame $511_1$ may indicate motion relative to I-frame $510_1$, even though B-frames $512_1$ and $512_2$ are captured between I-frame $510_1$ and P-frame $511_1$. Furthermore, the motion vectors associated with a B-frame may indicate relative motion forward in time or backward in time. In one embodiment, compression block 250 may generate a plurality of processed frames of video, including representations of objects with an applied motion blur effect, based on a single motion vector that spans a plurality of frames of source video data. For example, a motion vector associated with a macroblock in P-frame $511_1$ may be used to generate modified video frames corresponding to I-frame $510_1$, B-frame $512_1$ and B-frame $512_2$.

In yet another embodiment, compression block 250 may apply the motion blur effect only if motion vectors from a plurality of frames indicate uniform motion. For example, a motion vector associated with P-frame $511_1$ may indicate motion in a particular direction. Compression block 250 may then attempt to correlate the direction of that motion vector in P-frame $511_1$ with motion vectors associated with macroblocks in B-frame $512_1$ and B-frame $512_2$ that are located along the path indicated by the motion vector in P-frame $511_1$. By confirming that the motion of an object spans a plurality of frames and is substantially uniform in direction, the motion blur may be more accurately applied to objects in motion rather than applying the motion blur effect to motionless objects that are simply encoded more efficiently by using a motion vector that points to a similar group of pixels in the predictive frame.

As described above, compression block 250 applies the motion blur to the video during encoding. In other embodiments, the motion blur effect may be applied to the video frames during a decoding operation in a substantially similar manner. In such embodiments, compression block 250 encodes digital video 142 without applying the motion blur effect. For example, compression block 250 may implement a conventional H.264/MPEG-4 Part 10 codec to generate digital video 142. Then, a decompression block is implemented by digital video camera 100 or any other peripheral device configured to decode the compressed digital video 142.

Figure 8:
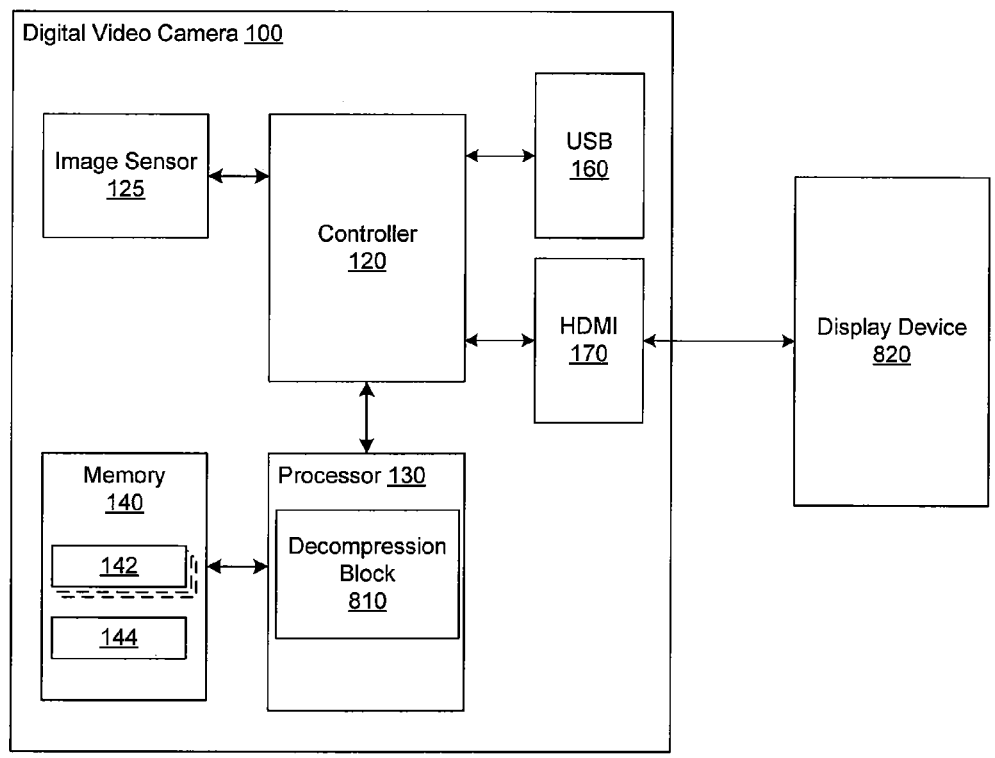
FIG. 8 illustrates a digital video camera 100 that is configured to decompress digital video file 142, according to one example embodiment.

FIG. 8 illustrates a digital video camera 100 that is configured to decompress digital video file 142, according to one example embodiment. Most of the elements of digital video camera 100 are described above in conjunction with FIG. 1. In one embodiment, processor 130 implements a decompression block 810 configured to decompress digital video 142 and output a video signal to a peripheral display device 820 via HDMI interface 170. In alternative embodiments, decompression block 810 may be configured to transmit a decompressed version of digital video 142 to a peripheral device (i.e., a personal computer or a set-top box) via USB interface 160 or some other communications interface.

Digital video 142 is compressed using a conventional motion-compensation based encoder such as an encoder that conforms to the H.264/MPEG-4 Part 10 standard. If digital video 142 is captured using fast exposure times for each frame relative to the frame rate associated with the digital video 142, then a stuttering effect may be noticeable during video playback. In one embodiment, exposure information and frame rate may be included within metadata associated with digital video 142. Decompression block 810 may be configured to apply a motion blur effect to the macroblocks of the decompressed video frames based on the motion vector information encoded into digital video 142. For example, decompression block 810 could be configured to decode a plurality of frames of video, keeping track of the motion vectors associated with each macroblock of the decompressed frames of video. Then, decompression block 810 may analyze the decompressed video data along with the motion vector data to determine whether to apply a motion blur effect to at least a portion of one or more frames of the decompressed video data. After any motion blur effects have been applied, the processed video data is transmitted to a peripheral display device 820 for display via HDMI interface 170.

It will be appreciated that the approach described above may be implemented in a device other than digital video camera 100. For example, digital video 142 may be transmitted to an electronic device such as a personal computer or a digital television that implements decompression block 810. The electronic device may decompress digital video 142, apply the motion blur effect to the decompressed video, and display the processed video data or transmit the processed video data to a peripheral display device. Other devices that implement decompression block 810 other than digital video camera 100 are within the scope of this disclosure.

Figure 9:
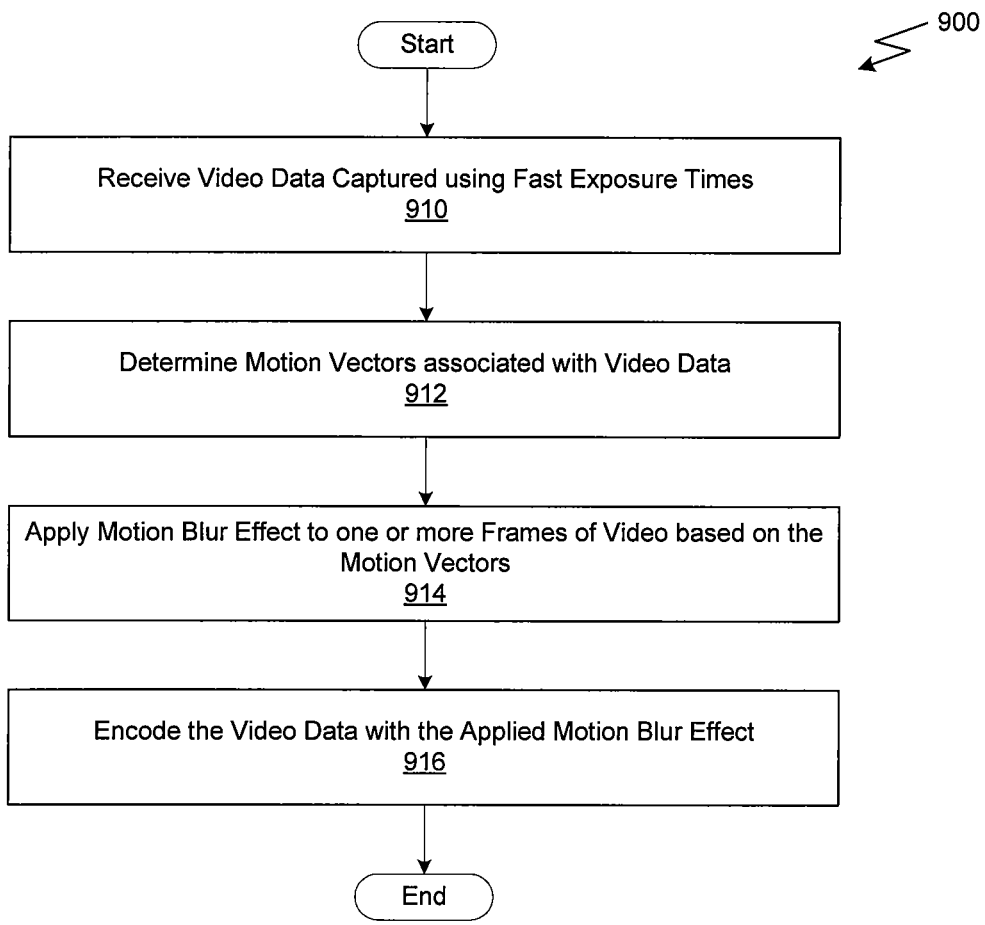
FIG. 9 is a flow diagram of method steps 900 for applying a motion blur effect to video data captured using fast exposure times, according to one example embodiment.

FIG. 9 is a flow diagram of method steps 900 for applying a motion blur effect to video data captured using fast exposure times, according to one example embodiment. Although the method steps 900 are described in conjunction with the systems of FIGS. 1-5 and 7-8, persons skilled in the art will understand that any system configured to perform the method steps is within the scope of the present disclosure.

Method 900 begins at step 910 where a processor 130 that implements a video codec receives video data captured using fast exposure times. In one embodiment, compression block 250 receives partially processed video data captured via image sensor 125 of digital video camera 100. At step 912, the processor 130 generates a plurality of motion vectors for one or more frames of the video data. In one embodiment, compression block 250 generates the motion vectors via a block matching algorithm. At step 914, processor 130 generates one or more modified frames of video by applying a motion blur effect to one or more macroblocks within the received video data. At step 916, processor 130 encodes the video data with the modified frames via a motion-compensated compression algorithm. The digital video 142 may be stored in a non-volatile memory or transmitted to a peripheral display device 820 for viewing. Then, method 900 terminates.

Figure 10:
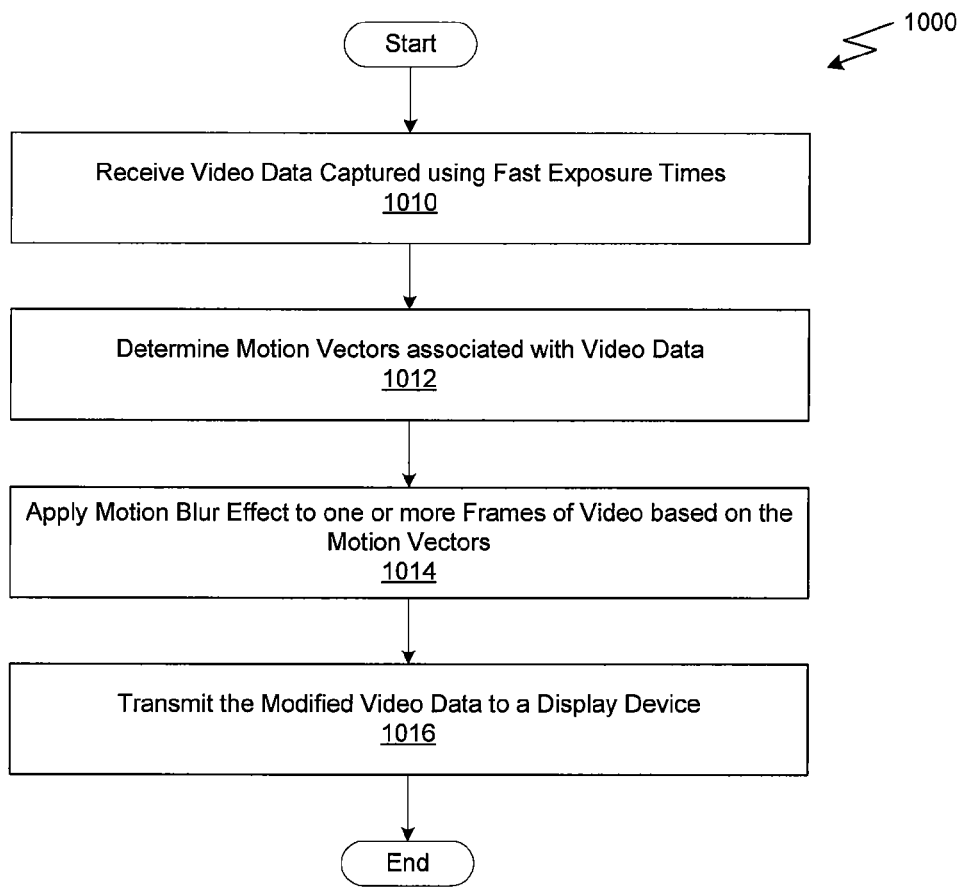
FIG. 10 is a flow diagram of method steps 1000 for applying a motion blur effect to video data captured using fast exposure times, according to another example embodiment.

FIG. 10 is a flow diagram of method steps 1000 for applying a motion blur effect to video data captured using fast exposure times, according to another example embodiment. Although the method steps 1000 are described in conjunction with the systems of FIGS. 1-5 and 7-8, persons skilled in the art will understand that any system configured to perform the method steps is within the scope of the present disclosure.

Method 1000 begins at step 1010 where a processor 130 that implements a video codec receives video data captured using fast exposure times. In one embodiment, decompression block 810 receives digital video 142 encoded via a motion-compensated compression algorithm such as H.264/MPEG-4 AVC. At step 1012, the processor 130 determines motion vectors for one or more frames of the video data. In one embodiment, decompression block 810 determines the motion vectors by reading the encoded digital video 142 which includes data associated with each macroblock of each encoded frame. Macroblocks included in P-frames or B-frames may include a motion vector along with an identifier of a reference frame associated with the motion vector. At step 1014, processor 130 generates one or more modified frames of video by applying a motion blur effect to one or more macroblocks within the decompressed video data. In one embodiment, decompression block 810 decodes the digital video 142 to generate decompressed video data. Based on the motion vectors included in digital video 142, decompression block 810 applies a motion blur effect to one or more frames of the decompressed video data. At step 1016, processor 130 transmits the modified video data to a peripheral display device 820 for viewing. Then, method 1000 terminates.

Electronically Controller Neutral Density Filter

Figure 11:
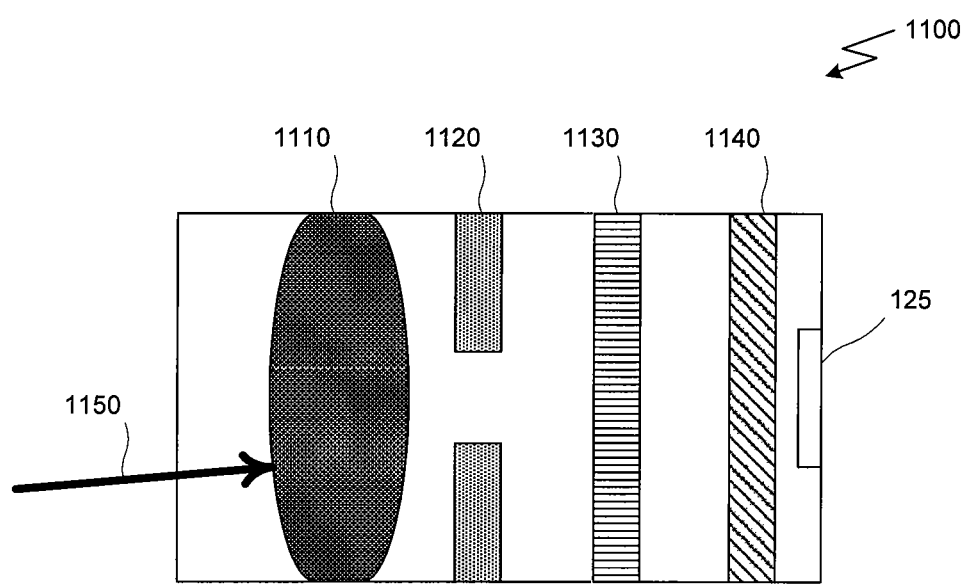
FIG. 11 illustrates a lens assembly 1100 included in a digital video camera 100, according to one example embodiment.

A second solution for improving video stuttering implements an electronically controlled neutral density filter in front of the image sensor 125 to attenuate the amount of light reaching the image sensor and extend the exposure time in bright light conditions. FIG. 11 illustrates a lens assembly 1100 included in a digital video camera 100, according to one example embodiment. As shown in FIG. 11, lens assembly 1100 includes a lens 1110, a fixed aperture 1120, a shutter 1130, an electronically actuated filter 1140, and image sensor 125. In one embodiment, the electronically actuated filter 1140 is a liquid crystal display (LCD) device such as a twisted nematic (TN) field effect LCD or a polymer dispersed LCD. The LCD device may be configured to attenuate the amount of light 1150 (i.e., photons) that reaches the image sensor 125 based on a voltage level applied to the LCD device. In alternate embodiments, electronically actuated filter 1140 may be a different type of electronically controlled filter 1140 that is configured to allow light 1150 to pass in proportion to an applied voltage. For example, electronically actuated filter 1140 may be an electrochromic device, a suspended particle device, or a microblind device.

In a preferred embodiment, the electronically actuated filter 1140 may be capable of being set to a plurality of transparency levels. For example, an LCD device may increase the level of transparency proportional to the voltage applied to the LCD device. Controller 120 may be configured to transmit different voltage levels as a control signal to the electronically actuated filter 1140 that causes the level of transparency of the electronically actuated filter 1140 to change, thereby attenuating the amount of light that reaches the image sensor 125. In one embodiment, the level of transparency may be non-linear relative to the applied voltage. Controller 120 may be calibrated to output different voltage levels corresponding to a plurality of discrete levels of attenuation. The voltage levels corresponding to each level of attenuation may be set during manufacture of the digital video camera 100 by calibrating the system using a standard light source and by reading the output of the image sensor 125 in response to that light source. Then, during operation, the electronically actuated filter 1140 may be configured to switch between the discrete voltage levels. In one embodiment, the LCD device may be configured to use sixteen different discrete levels of attenuation.

In other embodiments, the electronically actuated filter 1140 may be bimodal, having two discrete states—transparent and partially opaque. In such embodiments, the digital video camera 100 may be configured to cause the electronically actuated filter 1140 to be transparent when shooting in low light conditions and be partially opaque when shooting in bright light conditions. The partially opaque condition may allow the exposure times to be slowed considerably, thereby enabling at least some motion blur to be captured by the image sensor.

In yet other embodiments, a bimodal electronically actuated filter 1140 may implement a ferroelectric LCD device that is capable of switching times in the microsecond range. It will be appreciated that high frequency switching using a pulse width modulation technique enables a bimodal actuator to approximate a linear attenuation of light. For example, given a ferroelectric LCD device that has switching times on the order of 1 microsecond, the ferroelectric LCD may be controlled with a PWM signal at a switching frequency of 10 kHz (i.e., 100 µs) and a duty cycle between 0% and 100%. The effect of using a PWM signal is to expose the image sensor 125 to a fully transparent image for a portion of the duty cycle and expose the image sensor to a partially opaque image for the remaining portion of the duty cycle. Because the image sensor 125 is fully exposed many times each frame, the accumulation of charge on the image sensor 125 results in an image that approximates a neutral density filter with a constant exposure.

Implementing an electronically actuated filter 1140 may cause a color shift in the captured image (i.e., the filter may not be an ideal neutral density filter). Therefore, when the electronically actuated filter 1140 is applied, the color correction block 220 may be configured to adjust the coefficients in the color correction matrix to correct for any shift in intensity values of the pixels caused by the electronically actuated filter 1140.

Figure 12:
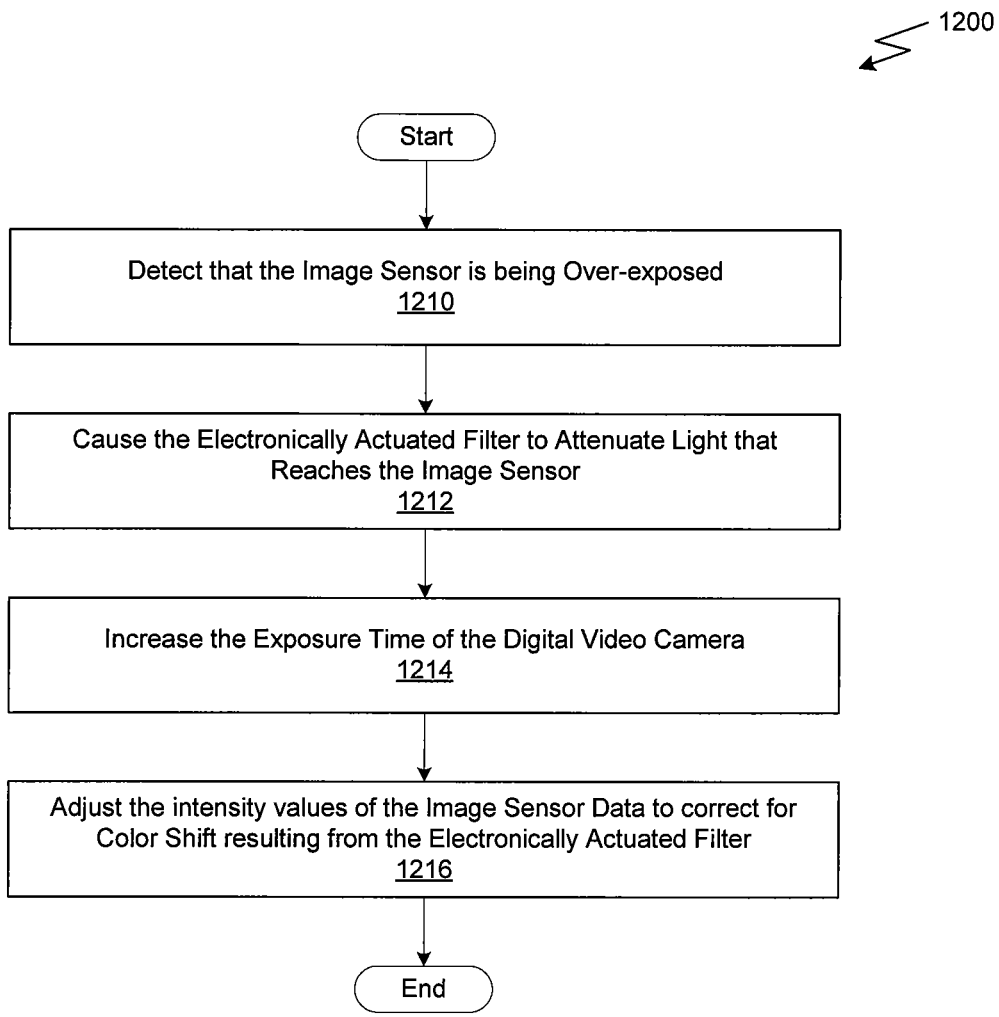
FIG. 12 is a flow diagram of method steps 1200 for attenuating light captured by a digital image sensor, according to one example embodiment.

FIG. 12 is a flow diagram of method steps 1200 for attenuating light captured by a digital image sensor, according to one example embodiment. Although the method steps 1200 are described in conjunction with the systems of FIGS. 1-5 and 11, persons skilled in the art will understand that any system configured to perform the method steps is within the scope of the present disclosure.

Method 1200 begins at step 1210 where the digital video camera 100 detects that the image sensor 125 is being overexposed. In one embodiment, the digital video camera 100 includes an automatic exposure algorithm that electronically adjusts the speed of the shutter 1130 to match a target exposure value. If the shutter speed drops below a threshold value, then the digital camera 100 determines that the image sensor 125 is overexposed. In alternate embodiments, the digital video camera 100 analyzes the intensity values of the pixels received from the image sensor 125. If a threshold number of pixels are associated with a high luminance intensity value, such as the intensity value associated with white light, then the digital video camera 100 determines that the image sensor 125 is overexposed. In yet other embodiments, the digital video camera 100 may analyze the average intensity values of a scene and if the average intensity value is above a threshold value, the digital video camera 100 determines that the image sensor 125 is overexposed.

At step 1212, digital video camera 100 adjusts the electronically actuated filter 1140 to adjust the amount of light that reaches the image sensor 125. In one embodiment, the electronically actuated filter 1140 is an LCD device having sixteen discrete levels of attenuation. Controller 120 may be configured to select a voltage to apply to the electronically actuated filter 1140 to enable the exposure time to be selected for capturing motion blur without overexposing the digital video 142. At step 1214, digital video camera 100 adjusts the exposure time (i.e., the electronically controlled shutter speed) to capture motion blur of moving objects. In one embodiment, the exposure time may be automatically adjusted based on an analysis of the image sensor data after the electronically actuated filter is adjusted.

At step 1216, the digital video camera 100 may correct for any color shift in the image sensor data caused by the adjustment of the electronically actuated filter 1140. In one embodiment, color correction block 220 may include a different color correction matrix for each of the discrete levels of attenuation of the electronically actuated filter 1140. For example, color correction block 220 may include 16 different color correction matrices that are selected depending on the voltage level output to the electronically actuated filter 1140. Then, method 1200 terminates.

In sum, example embodiments provide systems and methods for improving video stutter in high resolution progressive video. In one embodiment, the digital image processing pipeline applies a motion blur effect to any portions of the frame that are associated with a moving object, based on a motion estimation algorithm implemented by a video codec in the digital video processing pipeline. In another embodiment, an electronically actuated filter is inserted between the lens and the image sensor to attenuate the amount of light that reaches the image sensor. The electronically actuated filter is variable between substantially transparent and at least partially opaque such that the camera can attenuate light in bright light conditions.

Advantageously, each of these two solutions provides a cost effective method to produce digital video without the distracting stuttering effect. The systems described above do not require an adjustable aperture like many high-end video cameras in order to capture video using long exposure times in bright conditions. The first approach, applying a motion blur effect to video captured with a fixed aperture digital camera device, may be implemented in a slightly modified motion-compensation based video compression operation. This approach adds very little additional cost in terms of the hardware or processing capacity of a simple digital video camera. The second approach, implementing an electronically actuated filter in between a lens and the image sensor in order to attenuate the amount of light captured by the image sensor, is an improvement over a mechanically adjustable aperture such as a mechanical iris in terms of both cost and size. In addition, attenuating the light reaching the image sensor independently of the aperture size enables the DOF to remain fixed, keeping multiple objects in a scene in focus.

One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments, other and further embodiments of the disclosure may be devised without departing from the basic scope thereof. Therefore, the scope of the present disclosure is determined by the claims that follow.

I claim:

1. A method, comprising:
   detecting that at least two frames of a digital video sequence are associated with a first shutter speed that is greater than a frame rate of the digital video sequence;
   determining that an image sensor is receiving light at a first intensity level through an electronically actuated filter having a first transparency level in response to receiving a first voltage level;
   adjusting, by a controller, the first transparency level of the electronically actuated filter to a second transparency level such that the image sensor is not overexposed by light passing through the electronically actuated filter by applying a second voltage level to the electronically actuated filter to attenuate the amount of light reaching the image sensor; and
   adjusting the first shutter speed associated with the digital video sequence to a second shutter speed that is slower than the first shutter speed based on the second transparency level of the electronically actuated filter and the frame rate of the digital video sequence.

2. The method of claim 1, wherein the electronically actuated filter comprises a liquid crystal display (LCD) device, and wherein an output of the image sensor comprises at least one of an exposure value and an intensity value of light reaching the image sensor.

3. The method of claim 1, wherein a ratio of the first shutter speed to the second shutter speed is approximately equal to a ratio of the first transparency level associated with the LCD device prior to adjusting the electronically actuated filter to the second transparency level associated with the LCD device after applying the first voltage level to the electronically actuated filter.

4. The method of claim 1, wherein the LCD device is capable of realizing a plurality of discrete transparency levels between the first transparency level and second transparency level.

5. The method of claim 4, wherein the first transparency level is substantially translucent and the second transparency level is substantially opaque, and wherein adjusting the electronically actuated filter comprises applying a pulse width modulation (PWM) signal to the LCD device to approximate an intermediate transparency level, of the plurality of discrete transparency levels, that is between the first transparency level and second transparency level.

6. The method of claim 5, further comprising adjusting an intensity value of a pixel received from the image sensor based on which one of the first transparency level, the second transparency level or the intermediate transparency level that is associated with the electronically actuated filter.

7. A non-transitory computer-readable medium including instructions that, when executed by a processing unit, cause the processing unit to perform the steps of:
   detecting that at least two frames of a digital video sequence are associated with a first shutter speed that is greater than a frame rate of the digital video sequence;
   determining that an image sensor is receiving light at a first intensity level through an electronically actuated filter having a first transparency level in response to receiving a first voltage level;
   adjusting, by a controller, the first transparency level of the electronically actuated filter to a second transparency level such that the image sensor is not overexposed by light passing through the electronically actuated filter by applying a second voltage level to the electronically actuated filter to attenuate the amount of light reaching the image sensor; and
   adjusting the first shutter speed associated with the digital video sequence to a second shutter speed that is slower than the first shutter speed based on the second transparency level of the electronically actuated filter and the frame rate of the digital video sequence.

8. The computer-readable medium of claim 7, wherein the electronically actuated filter comprises a liquid crystal display (LCD) device, and wherein an output of the image sensor comprises at least one of an exposure value and an intensity value of light reaching the image sensor.

9. The computer-readable medium of claim 7, wherein a ratio of the first shutter speed to the second shutter speed is approximately equal to a ratio of the first transparency level associated with the LCD device prior to adjusting the electronically actuated filter to the second transparency level associated with the LCD device after applying the first voltage level to the electronically actuated filter.

10. The computer-readable medium of claim 7, wherein the LCD device is capable of realizing a plurality of discrete transparency levels between the first transparency level and second transparency level.

11. The computer-readable medium of claim 10, wherein the first transparency level is substantially translucent and the second transparency level is substantially opaque, and wherein adjusting the electronically actuated filter comprises applying a pulse width modulation (PWM) signal to the LCD device to approximate an intermediate transparency level, of the plurality of discrete transparency levels, that is between the first transparency level and second transparency level.

12. The computer-readable medium of claim 11, further comprising adjusting an intensity value of a pixel received from the image sensor based which one of the first transparency level, the second transparency level or the intermediate transparency level that is associated with the electronically actuated filter.

13. A system, comprising:
a processing unit configured to:
    detect that at least two frames of a digital video sequence are associated with a first shutter speed that is greater than a frame rate of the digital video sequence;
    determine that an image sensor is receiving light at a first intensity level through an electronically actuated filter having a first transparency level in response to receiving a first voltage level;
    adjust, by a controller, the first transparency level of the electronically actuated filter to a second transparency level such that the image sensor is not overexposed by light passing through the electronically actuated filter by applying a second voltage level to the electronically actuated filter to attenuate the amount of light reaching the image sensor; and
    adjust the first shutter speed associated with the digital video sequence to a second shutter speed that is slower than the first shutter speed based on the second transparency level of the electronically actuated filter and the frame rate of the digital video sequence.

14. The system of claim 13, wherein the electronically actuated filter comprises a liquid crystal display (LCD) device, and wherein an output of the image sensor comprises at least one of an exposure value and an intensity value of light reaching the image sensor.

15. The system of claim 13, wherein a ratio of the first shutter speed to the second shutter speed is approximately equal to a ratio of the first transparency level associated with the LCD device prior to adjusting the electronically actuated filter to the second transparency level associated with the LCD device after applying the first voltage level to the electronically actuated filter.

16. The system of claim 13, wherein the LCD device is capable of realizing a plurality of discrete transparency levels between the first transparency level and second transparency level.

17. The system of claim 16, wherein the first transparency level is substantially translucent and the second transparency level is substantially opaque, and wherein adjusting the electronically actuated filter comprises applying a pulse width modulation (PWM) signal to the LCD device to approximate an intermediate transparency level, of the plurality of discrete transparency levels, that is between the first transparency level and second transparency level.

18. The system of claim 13, the processor being further configured to adjust an intensity value of a pixel received from the image sensor based on which one of the first transparency level, the second transparency level or the intermediate transparency level that is associated with the electronically actuated filter.

* * * * *